United States Patent
Jun et al.

(10) Patent No.: US 7,867,316 B2
(45) Date of Patent: Jan. 11, 2011

(54) METHOD OF MANUFACTURING METAL NANOPARTICLES

(75) Inventors: Byung-Ho Jun, Seoul (KR); Dong-Hoon Kim, Seongnam-si (KR); Kwi-Jong Lee, Hwaseong-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 501 days.

(21) Appl. No.: 12/081,263

(22) Filed: Apr. 14, 2008

(65) Prior Publication Data

US 2009/0120238 A1 May 14, 2009

(30) Foreign Application Priority Data

Nov. 9, 2007 (KR) .................... 10-2007-0114531

(51) Int. Cl.
*B22F 9/24* (2006.01)
(52) U.S. Cl. .................... 75/351; 75/371; 75/373; 977/890; 977/896
(58) Field of Classification Search .................... None
See application file for complete search history.

(56) References Cited

U.S. PATENT DOCUMENTS 7,524,354 B2 * 4/2009 Zhong et al. .................. 75/370

| 2005/0235776 A1 * | 10/2005 | He et al. .................... 75/255 |
| 2006/0112783 A1 * | 6/2006 | Ahlin et al. .................... 75/252 |
| 2006/0189113 A1 * | 8/2006 | Vanheusden et al. ........ 438/597 |
| 2006/0254387 A1 * | 11/2006 | Lee et al. .................... 75/252 |
| 2007/0186725 A1 * | 8/2007 | Watabe .................... 75/744 |

OTHER PUBLICATIONS

Horovitz, O. et al., "Amino Acids Binding to Gold Nanoparticles", Studia Universitatis Babes-Bolyai, Chemia, vol. LII No. 3, 2007.*

* cited by examiner

*Primary Examiner*—George Wyszomierski
(74) *Attorney, Agent, or Firm*—McDermott Will & Emery LLP

(57) ABSTRACT

The present invention relates to a method for manufacturing metal nanoparticles including: preparing a first solution including a metal precursor and a non-polar solvent; preparing a second solution with adding a capping molecule presented by the following Formula 1 into the first solution; and stirring the second solution with applying heat, $$R2-(CH_2)_x-\overset{O}{\underset{\|}{C}}-NH-(CH_2)_y-R1 \quad (1)$$

wherein R1 and R2 are independently —COOH, —NH$_2$ or —CH$_3$ but R1 and R2 cannot be —COOH at the same time, and x and y is independently an integer from 3 to 20 respectively and x+y is 20 to 40.

12 Claims, 1 Drawing Sheet

METHOD OF MANUFACTURING METAL NANOPARTICLES

CROSS-REFERENCE TO RELATED APPLICATION

This application claims the benefit of Korean Patent Application No. 10-2007-0114531 filed on Nov. 9, 2007, with the Korea Intellectual Property Office, the contents of which are incorporated here by reference in its entirety.

BACKGROUND

1. Technical Field

The present invention relates to a method for manufacturing metal nanoparticles and in particular, to a method for manufacturing metal nanoparticles which can easily control size of the metal nanoparticles and make metal nanoparticles' dispersibility higher without using a polymer dispersing agent under a non-polar solvent.

2. Description of the Related Art

There are chemical manufacturing method, mechanical manufacturing method and electrical manufacturing method in producing metal nanoparticles.

It is difficult to synthesize nanoparticles of high purity and uniform size due to the entrainment of impurity in mechanical process where mechanical power is used in grinding. As to electrical manufacturing method employing electrolysis, the production efficiency is low since the throughput time is long and yield of particles produced is low.

Meantime, there are two major chemical methods of producing metal nanoparticles, namely the vapor method and the colloid method. However, since the vapor method which uses plasma or gas evaporation requires highly expensive equipment, the colloid method by which particles of uniform size can be synthesized at low cost is generally used.

The method of manufacturing metal nanoparticles by the colloid method is separated into an aqueous method and a non-aqueous method. In the aqueous method, since a particle distribution is relatively big and a size of the synthesized particles is basically tens of nano-size, an oxidation speed is slow. Therefore there is a problem that synthesizing metal nanoparticles in high concentration is difficult, even though it is no need to special treat to prevent an oxidation.

The other hand, in the non-aqueous method, compared to the aqueous method, particles of uniform size can-be synthesized and synthesizing tens of nano-size of metal particles is possible. However, because the size of nanoparticles is generally just tens of nano-size, size growth of dispersed nanoparticles is limited when metal nanoparticles are synthesized with the non-aqueous method.

For those reasons, it is necessary to study about new method which can control the size of nanoparticles and can propose higher dispersibility in the non-aqueous method.

SUMMARY

On behalf of settle the above-mentioned problems, the invention provides a method of manufacturing metal nanoparticles which can easily control size of the metal nanoparticles and make metal nanoparticles' dispersibility higher by using non-aqueous method.

The invention provides a method of manufacturing metal nanoparticles including preparing a first solution having metal precursor and a non-polar solvent;

preparing a second solution with adding a capping molecule presented by the following Formula 1 into the first solution; and stirring the second solution with applying heat,

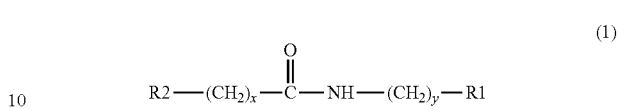

(1)

wherein R1 and R2 are independently —COOH, —NH$_2$ or —CH$_3$, but both R1 and R2 cannot be —COOH; and x and y is independently an integer from 3 to 20, and x+y is 20 to 40.

According to an embodiment of the invention, the capping molecule may be CH$_3$—(CH$_2$)$_{17}$—CO—NH—(CH$_2$)$_9$—CH$_3$ or NH$_2$—(CH$_2$)$_{17}$—CO—NH—(CH$_2$)$_9$—CH$_3$.

According to another embodiment of the invention, the first solution may further include an amine compound and the amine compound may have a structure of C$_x$H$_{2x+1}$NH$_2$ wherein x can be an integer from 2 to 20. Examples of the amine compound may be at least one selected from the group consisting of butylamine, propylamine, octylamine, decylamine, dodecylamine, hexadecylamine and oleylamine.

Also, the metal precursor may be at least one selected from the group consisting of copper, silver, nickel, iron, gold, platinum, palladium, zinc, titanium and their alloys and examples thereof may be at least one selected from the group consisting of AgCl, AgNO$_3$, AgBF$_4$, AgPF$_6$, Ag$_2$O, CH$_3$COOAg, AgCF$_3$SO$_3$, AgClO$_4$, CuCl$_2$, Cu(NO$_3$)$_2$, CuSO$_4$, (CHCOO)$_2$Cu and copper acetyloacetate(Cu(acac)$_2$).

According to one embodiment, the non-polar solvent may be at least one selected from the group consisting of toluene, hexane, diphenylether, octylether, dimethylformaldehyde, tetrahydrofuran, 1-octadecene, and tetradecane.

According to one embodiment, the stirring the second solution with applying heat may be performed at 60 to 120° C. and, according to another embodiment, the stirring the second solution with applying heat may be performed at 60 to 110° C.

Also, according to another embodiment, a reducing agent may be further added into the second solution. Herein, the reducing agent may be at least one selected from the group consisting of NaBH$_4$, LiBH$_4$, KBH$_4$, N$_2$H$_4$, PhHNNH$_2$, NH$_3$—BH$_3$, (CH$_3$)$_3$N—BH$_3$, NaH$_2$PO$_2$, formic acid, and tetrabutylammonium borohydride.

DETAILED DESCRIPTION

Figure 1:
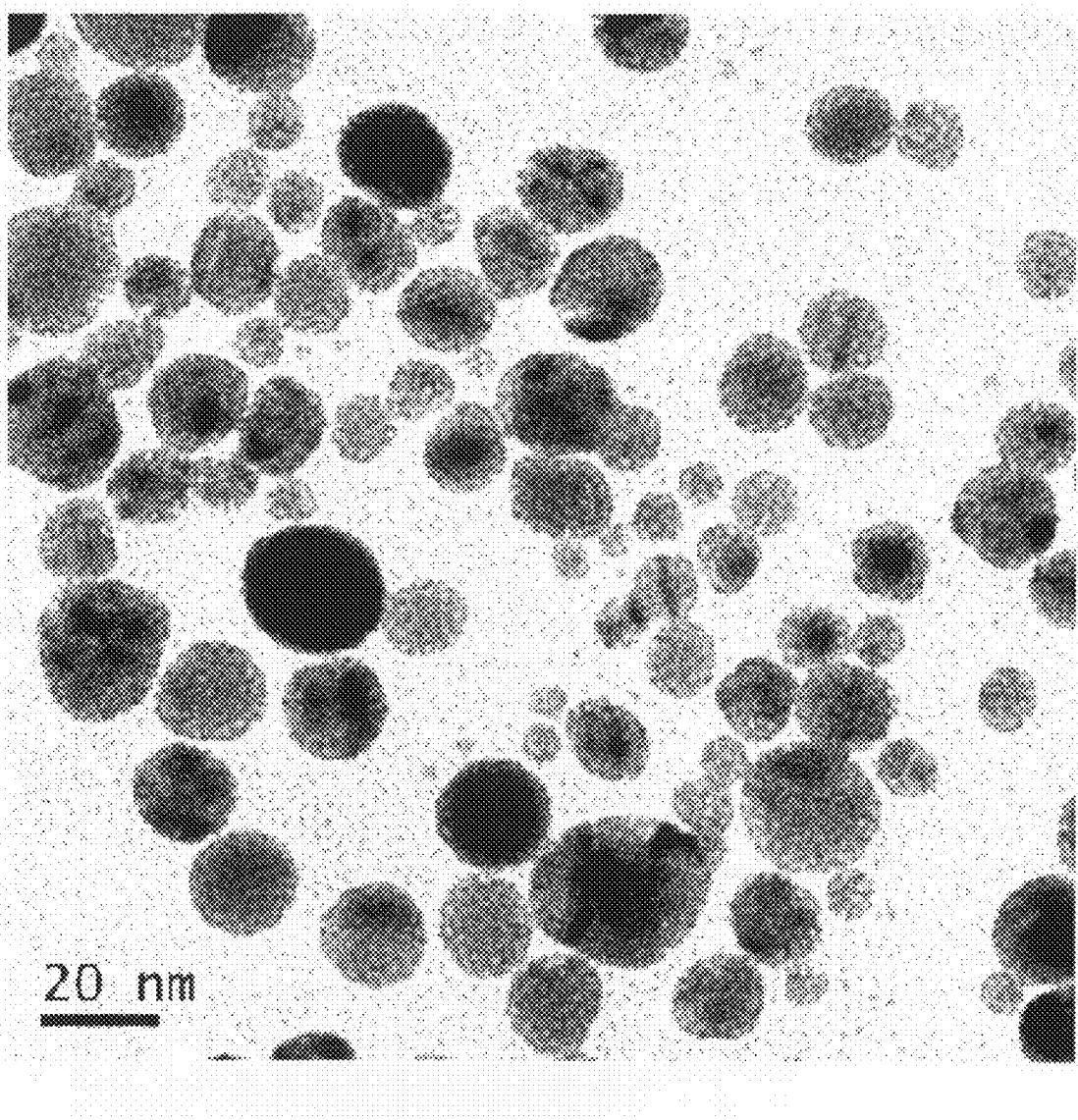
FIG. 1 is a TEM image of the metal nanoparticles produced according to an embodiment of the invention.

The invention provides a method of manufacturing metal nanoparticles including:

preparing a first solution having a metal precursor and a non-polar solvent;

preparing a second solution with adding a capping molecule presented by the following Formula 1 into the first solution; and stirring the second solution with applying heat.

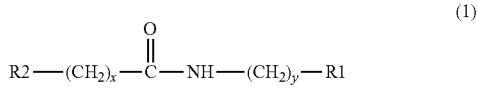

$$R2-(CH_2)_x-\overset{O}{\underset{\|}{C}}-NH-(CH_2)_y-R1 \qquad (1)$$

wherein R1 and R2 are independently —COOH, —NH$_2$ or —CH$_3$, but both R1 and R2 cannot be —COOH, and x and y is independently an integer from 3 to 20 and x+y is 20 to 40.

Conventionally, when manufacturing metal nanoparticles in a non-aqueous method, a capping molecule of monomolecular is used for synthesizing nanoparticles having dispersibility and the structure of the capping molecule has 3 to 18 carbon atoms including one selected from the group consisting of phosphorus, sulfur, oxygen and nitrogen. The capping molecule has a function of coating the surface of the nanoparticles to prevent aggregation which is caused by the growth of the attraction between nanoparticles according to the growth of nanoparticle size.

However, because a general capping molecule cannot prevent the attraction if the size of metal nanoparticles is over 10 to 15 nm, it is hard to control the nanoparticle size. Therefore it can limit to produce nanoparticle size in a non-aqueous method. For such reasons, an aqueous method has been used to produce nanoparticles having tens of nanometers by using a polymer dispersing agent.

The capping molecule used in the method of manufacturing metal nanoparticles of the invention is not a polymer but has a long carbon chain having 20 to 40 carbons, so that tens of nanometer particles can be obtained by using a non-aqueous method and stable dispersibility of such nanoparticles can be accomplished.

In the capping molecule of Formula 1, capping the nanoparticles occurs where amide functional groups of CO—NH are, a tail part of the carbon chain controls a particle size. However, when both R1 and R2 are —COOH at the same time, aggregation between the capping molecules may be caused, so that R1 and R2 cannot be —COOH at the same time. If —COOH is placed at one of R1 and R2, capping can be happened at the end of the capping molecule.

Also, when one of R1 and R2 is —NH$_2$, dissociation can be easily carried in a non-aqueous solvent and thus the synthesis of nanoparticles is possible by only using a capping molecule, without further adding an amine compound or a reducing agent. Namely, the capping molecule having —NH$_2$ play a role of a dispersing agent and a reducing agent at the same time.

According to one embodiment of the invention, CH$_3$—(CH$_2$)$_{17}$—CO—NH—(CH$_2$)$_9$—CH$_3$ or NH$_2$—(CH$_2$)$_{17}$—CO—NH—(CH$_2$)$_9$—CH$_3$ can be used as a capping molecule and the capping molecule may be a compound of Formula 1 having an amide group but not limited to these.

The capping molecules can be mixed in a mole ratio of 0.1 to 50 based to the metal precursor. If the mole ratio is less than 0.1, control of growth of the nanoparticles is hard so that nanoparticles are overgrowth. If the mole ratio is more than 50, nanoparticles react non-uniformly. According to an embodiment the mole ratio is 0.5 to 10 and according to another embodiment the mole ratio is 1 to 3.

Also, the metal precursor according to the invention may be at least one selected from the group consisting of copper, silver, nickel, iron, gold, platinum, palladium, zinc, titanium and their alloys and examples may include silver or copper precursor such as AgCl, AgNO$_3$, AgBF$_4$, AgPF$_6$, Ag$_2$O, CH$_3$COOAg, AgCF$_3$SO$_3$, AgClO$_4$, CuCl$_2$, Cu(NO$_3$)$_2$, CuSO$_4$, (CHCOO)$_2$Cu and copper acetyloacetate (Cu(acac)$_2$), but not limited to these examples. CH$_3$COOAg and (CHCOO)$_2$Cu can be used at the aspect of economical and general purpose. The metal precursor can be used alone or in a combination of two or more. It is preferable if the metal precursor dissociates well in a non-polar solvent.

In an embodiment, the metal precursor can be added in molarity (M) of over 0.2 in a non-aqueous solvent. In another embodiment, the metal precursor can be added in molarity of 0.5 to 2.

According to one embodiment, not limited to these, the non-polar solvent may be at least one selected from the group consisting of toluene, hexane, diphenylether, octylether, dimethylformaldehyde, tetrahydrofuran, 1-octadecene and tetradecane.

According to another embodiment of the invention, in order to help the reduction in synthesizing nanoparticles and stable dispersion, the first solution may further include an amine compound.

The amine compound may have a structure of C$_x$H$_{2x+1}$NH$_2$ wherein x is an integer from 2 to 20. Examples of the amine compound may be at least one selected from the group consisting of butylamine, propylamine, octylamine, decylamine, dodecylamine, hexadecylamine and oleylamine and preferably butylamine can be used.

According to an embodiment of the invention, the amine compound can be used in molarity of 1 with respect to the metal precursor. According to another embodiment, butylamine which belongs to the amine compound is mixed in molarity of over 4 considering reaction condition and yield.

Hereinafter, the manufacturing method according to the invention will be described.

First, a first solution having a metal precursor and a non-polar solvent is prepared. A second solution is prepared by adding a capping molecule presented by Formula 1 into the first solution Then, the second solution is heated while stirring to yield and the heating temperature is 60 to 120° C. The reaction time is not limited if it is enough time to obtain the desired size of nanoparticles. If the heating temperature is lower than 60° C., the reaction is hardly progressed and if the heating temperature is higher than 120° C., the particles can be overgrowth because of overreaction. Stirring may be performed at 90 to 110° C. to reduce the reaction time.

Also, according to another embodiment, when nanoparticles are manufactured by further adding the amine compound, reduction can occur more easily and stable dispersibility of the nanoparticles can be accomplished. For example, desirable metal nanoparticles can be obtained at 60 to 110° C.

According to another embodiment of the invention, a reducing agent may be further added into the second solution so that nanoparticles can be dispersed more reliably and the reaction can be carried at a lower temperature. Here, after adding the reducing agent and the second solution into the first solution at the same, the temperature can be increased or the reducing agent can be added while maintaining an appropriate temperature after the second solution is heated.

The reducing agent may be at least one selected from the group consisting of NaBH$_4$, LiBH$_4$, KBH$_4$, N$_2$H$_4$, PhHNNH$_2$, NH$_3$—BH$_3$, (CH$_3$)$_3$N—BH$_3$, formic acid, NaH$_2$PO$_2$ and tetrabutylammonium borohydride.

The reducing agent may be added less than 1 mole ratio to the metal precursor. If the mole ratio is more than 1, the yield of the metal particles is decreased because of amalgamation between metal particles and explosion can be happened because of a drastic exothermic reaction. Moreover, the reducing agent is added in a mole ratio of 0.1 or more in order to perform the reduction. Therefore the reducing agent is added in a mole ratio of 0.1 to 1 with respect to the metal salt.

The invention can be understood through the flowing examples stated above and it is also apparent that more changes may be made by those skilled in the art without departing from the principles and spirit of the present invention.

EXAMPLE 1

0.1 mol $CH_3COOAg$ and 500 ml toluene were placed in a flask and 0.3 mol $NH_3—(CH_2)_{17}—CO—NH—(CH_2)_9—CH_3$ was added. The reaction mixture was heated till the temperature was raised up to 105° C. and stirred for 1 hour. After stirring, Ag nanoparticles were obtained by washing with ethanol.

EXAMPLE 2

0.1 mol $CH_3COOAg$, 0.2 mol butyl amine and 500 ml toluene were placed in a flask. The reaction mixture was heated till the temperature was raised up to 60° C. and stirred for 1 hour. After stirring, 0.1 mol $CH_3—(CH_2)_{17}—CO—NH—(CH_2)_9—CH_3$ was added, reaction mixture was heated to 105° C. and stirred for 1 hour. After tirring, Ag nanoparticles were obtained by washing with ethanol.

EXAMPLE 3

0.1 mol $(CHCOO)_2Cu$ and 500 ml toluene were placed in a flask and 0.3 mol $NH_3—(CH_2)_{17}—CO—NH—(CH_2)_9—CH_3$ was added. The reaction mixture was heated up to 100° C. and 0.2 mol formic acid was added. While the reaction temperature was maintained at 100° C., the reaction mixture was stirred for 1 hour. After stirring, copper nanoparticles were obtained by washing with ethanol.

EXAMPLE 4

0.1 mol $(CHCOO)_2Cu$, 0.4 mol butyl amine and 500 ml toluene were placed in a flask. The reaction mixture was heated till the temperature was raised up to 60° C. and stirred for 1 hour. After stirring, 0.1 mol $CH_3—(CH_2)_{17}—CO—NH—(CH_2)_9—CH_3$ and 0.2 mol formic acid were added, the reaction mixture was heated to 100° C. and stirred for 1 hour. After stirring, copper nanoparticles were obtained by washing with ethanol.

What is claimed is:

1. A method of manufacturing metal nanoparticles comprising:
   preparing a first solution including a metal precursor and a non-polar solvent;
   preparing a second solution by adding a capping molecule represented by the following Formula 1 into the first solution; and
   stirring the second solution with applying heat,

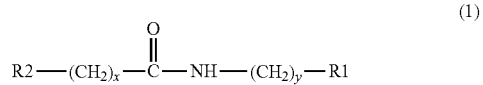

(1)

wherein R1 and R2 are independently —COON, —$NH_2$ or —$CH_3$ but R1 and R2 cannot be —COOH at the same time, and x and y is independently an integer from 3 to 20 respectively and x+y is 20 to 40.

2. The method of claim 1, wherein the capping molecule is at least one selected from the group consisting of $CH_3—(CH_2)_{17}—CO—NH—(CH_2)_9—CH_3$ and $NH_2—(CH_2)_{17}—CO—NH—(CH_2)_9—CH_3$.

3. The method of claim 1, wherein the first solution further comprises an amine compound.

4. The method of claim 3, wherein the amine compound has a structure of $C_xH_{2x+1}NH_2$ and x is an integer from 2 to 20.

5. The method of claim 4, wherein the amine compound is at least one selected from the group consisting of butylamine, propylamine, octylamine, decylamine, dodecylamine, hexadecylamine and oleylamine.

6. The method of claim 3, wherein the stirring the second solution with applying heat is performed at 60 to 110° C.

7. The method of claim 1 or claim 3, wherein a reducing agent is further added into the second solution.

8. The method of claim 7, wherein the reducing agent is at least one selected from the group consisting of $NaBH_4$, $LiBH_4$, $KBH_4$, $N_2H_4$, $PhHNNH_2$, $NH_3—BH_3$, $(CH_3)_3N—BH_3$, $NaH_2PO_2$, formic acid, and tetrabutylammonium borohydride.

9. The method of claim 1, wherein the metal precursor is a precursor of at least one metal selected from the group consisting of copper, silver, nickel, iron, gold, platinum, palladium, zinc, titanium and their alloys.

10. The method of claim 9, wherein the metal precursor is at least one selected from the group consisting of AgCl, $AgNO_3$, $AgBF_4$, $AgPF_6$, $Ag_2O$, $CH_3COOAg$, $AgCF_3SO_3$, $AgClO_4$, $CuCl_2$, $Cu(NO_3)_2$, $CuSO_4$, $(CHCOO)_2Cu$ and copper acetylacetate($Cu(acac)_2$).

11. The method of claim 1, wherein the non-polar solvent is at least one selected from the group consisting of toluene, hexane, diphenylether, octylether, dimethylformaldehyde, tetrahydrofuran, 1-octadecene and tetradecane.

12. The method of claim 1, wherein the stirring the second solution with applying heat is performed at 60 to 120° C.

* * * * *